(12) United States Patent
Kincaid

(10) Patent No.: US 12,515,017 B2
(45) Date of Patent: Jan. 6, 2026

(54) SUPPORT STRUCTURE FOR MEDICAL APPARATUS AND METHOD OF MANUFACTURING SAME

(71) Applicant: Canon U.S.A., Inc., Melville, NY (US)

(72) Inventor: Matthew Michael Kincaid, Medford, MA (US)

(73) Assignee: Canon U.S.A., Inc., Melville, NY (US)

( * ) Notice: Subject to any disclaimer, the term of this patent is extended or adjusted under 35 U.S.C. 154(b) by 1050 days.

(21) Appl. No.: 17/287,958

(22) PCT Filed: Oct. 23, 2019

(86) PCT No.: PCT/US2019/057705
§ 371 (c)(1),
(2) Date: Apr. 22, 2021

(87) PCT Pub. No.: WO2020/092096
PCT Pub. Date: May 7, 2020

(65) Prior Publication Data
US 2021/0308423 A1 Oct. 7, 2021

Related U.S. Application Data

(60) Provisional application No. 62/752,219, filed on Oct. 29, 2018.

(51) Int. Cl.
*A61M 25/01* (2006.01)
*A61M 25/00* (2006.01)

(52) U.S. Cl.
CPC .... *A61M 25/0147* (2013.01); *A61M 25/0108* (2013.01); *A61M 2025/0037* (2013.01); *A61M 2025/0059* (2013.01); *A61M 2025/015* (2013.01)

(58) Field of Classification Search
CPC ...... A61M 25/0147; A61M 2025/0059; A61M 2025/0063; A61M 25/0108; A61M 25/0136
See application file for complete search history.

(56) References Cited

U.S. PATENT DOCUMENTS 5,383,852 A * 1/1995 Stevens-Wright ............... A61M 25/0136
604/95.04
5,441,483 A * 8/1995 Avitall ............... A61B 18/1492
604/95.05
5,545,200 A * 8/1996 West ............... A61M 25/0136
606/29

(Continued)

FOREIGN PATENT DOCUMENTS

JP H02246920 A 10/1990
JP 10057500 A 3/1998

(Continued)

*Primary Examiner* — Nilay J Shah
(74) *Attorney, Agent, or Firm* — Canon U.S.A., Inc., IP Division

(57) ABSTRACT

An articulated medical device having a hollow central core and at least one support wires for preventing the medical device from kinking, wherein the device is capable of maneuvering through cavities to reach a target with minimal invasiveness, and once the medical device has reached the target, allowing a medical tool to be guided through the hollow central core for facilitating medical procedures, including endoscopes, cameras, and catheters, at the target.

13 Claims, 5 Drawing Sheets

(56) References Cited

U.S. PATENT DOCUMENTS

| | | | |
|---|---|---|---|
| 6,450,948 B1* | 9/2002 | Matsuura | A61B 1/0055 606/1 |
| 6,544,215 B1 | 4/2003 | Bencini et al. | |
| 9,833,595 B2* | 12/2017 | Gonzalez | A61M 25/0147 |
| 10,099,036 B2 | 10/2018 | Heideman et al. | |
| 2005/0096609 A1 | 5/2005 | Maginot | |
| 2005/0277874 A1* | 12/2005 | Selkee | A61M 25/0147 604/95.04 |
| 2007/0232858 A1 | 10/2007 | MacNamara | |
| 2010/0280449 A1 | 11/2010 | Alvarez et al. | |
| 2012/0190927 A1 | 7/2012 | Bernhard | |
| 2012/0232563 A1* | 9/2012 | Williams | A61M 25/0108 606/129 |
| 2013/0197490 A1 | 8/2013 | Stanton et al. | |
| 2014/0336572 A1 | 11/2014 | Heisel et al. | |
| 2015/0374211 A1 | 12/2015 | Smith et al. | |
| 2018/0064430 A1 | 3/2018 | Blitzer et al. | |

FOREIGN PATENT DOCUMENTS

| | | |
|---|---|---|
| JP | 2015002858 A | 1/2015 |
| JP | 2016172059 A | 9/2016 |
| WO | 2014/192447 A1 | 12/2014 |

\* cited by examiner

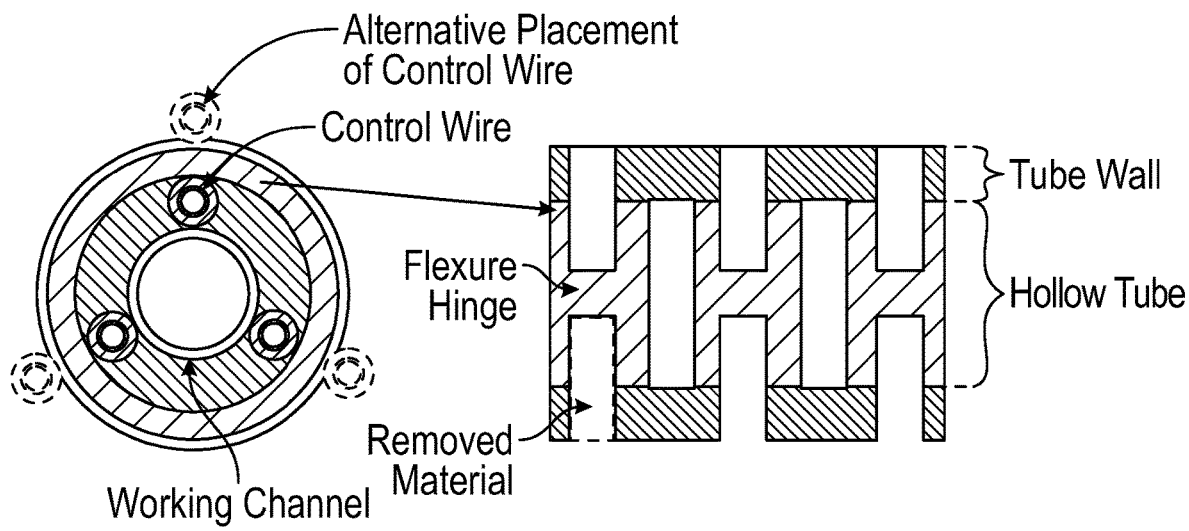
FIG. 1A
(Prior Art)
FIG. 1B
(Prior Art)
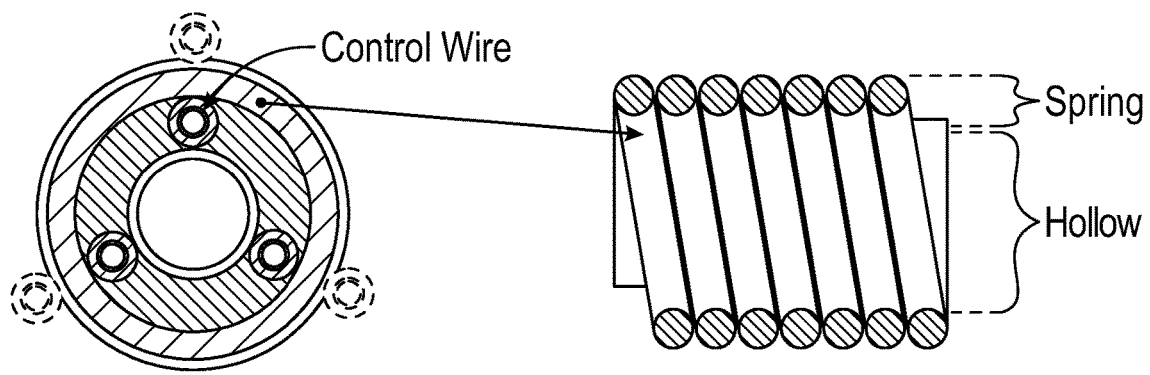
FIG. 2A
(Prior Art)
FIG. 2B
(Prior Art)

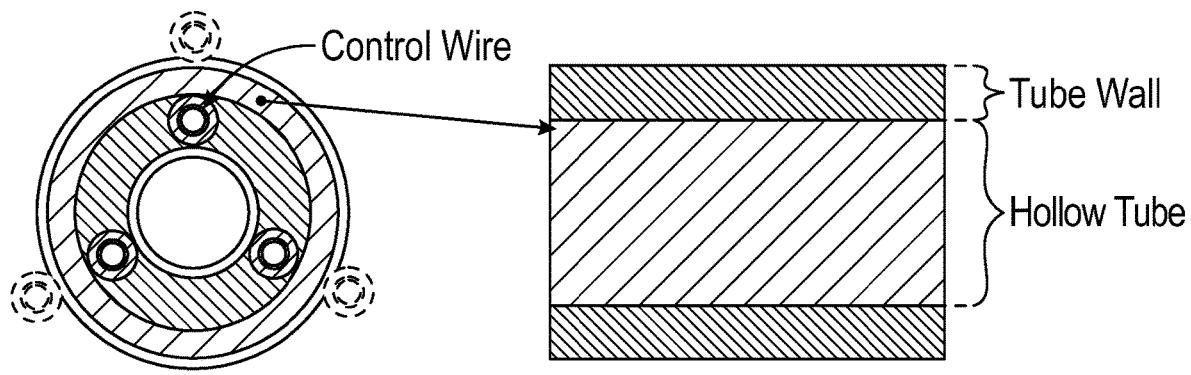
FIG. 3A
(Prior Art)
FIG. 3B
(Prior Art)
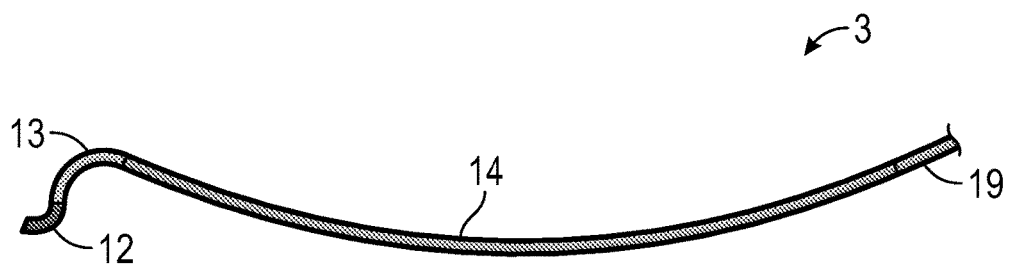
FIG. 4

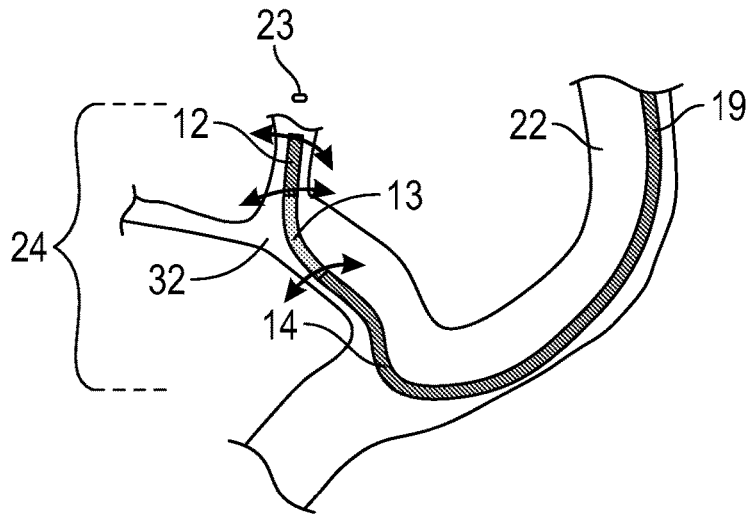
FIG. 5
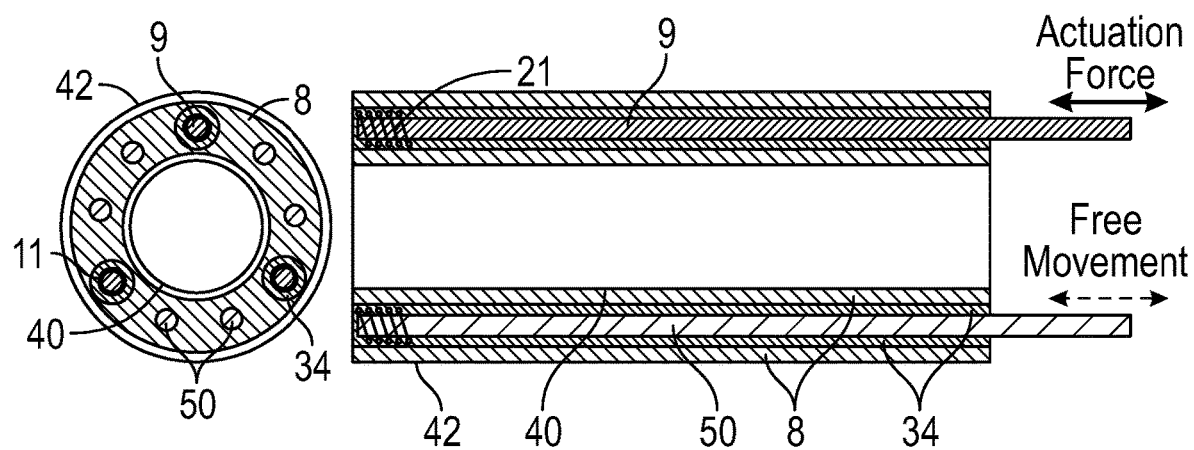
FIG. 6A   FIG. 6B

SUPPORT STRUCTURE FOR MEDICAL APPARATUS AND METHOD OF MANUFACTURING SAME

CROSS REFERENCE TO RELATED PATENT APPLICATIONS

This application claims priority to U.S. Provisional Patent Application No. 62/752,219, titled "Support Structure for Medical Apparatus and Method of Manufacturing Same" filed on Oct. 29, 2018, the disclosure of which is herein incorporated in its entirety by reference.

FIELD OF THE DISCLOSURE

The present disclosure relates generally to support structures for a medical apparatus and methods for manufacturing and incorporating the support structures. More particularly, the subject disclosure is directed to an articulated medical device having a hollow central cavity, wherein the device is capable of maneuvering within a patient without kinking. The support structure is instrumental in providing resiliency to the medical apparatus such that the medical apparatus does not kink or buckle when articulated. Exemplary uses for the medical apparatus may include endoscopes, cameras, and catheters, to name a few.

BACKGROUND OF THE DISCLOSURE

Bendable medical instruments such as endoscopic surgical instruments and catheters are well known and continue to gain acceptance in the medical field. The bendable medical instruments generally include flexible tubes commonly referred to as a sleeves or sheaths. One or more tool channels extend along (typically inside) the sheath to allow access to a target located at a distal end of the sheath.

The medical instruments are intended to provide flexible access within a patient, with at least one curve or more leading to the intended target, while retaining torsional and longitudinal rigidity so that a physician can control the tool being manipulated at the distal end of the medical instrument.

Recently, to enhance maneuverability of the distal end of the instrument, robotized instruments (also referred to as "robots") that control distal portions have emerged. In general, these robots are long instruments that are meant to be steerable through tortuous pathways and around objects to arrive at some desired location. The medical devices detailed herein are for insertion down a patients airway, through the trachea and into the lungs. However, the subject innovation can obviously be employed in various other circumstances and anatomical fissures.

Once there, the purpose of the robot, or steerable catheter, is to reach an area of interest and to provide a working channel for tools such as a biopsy forceps, which can be used to sample the local tissue. To reach the area of interest, the medical device must be flexible enough to bend along the pathways of the lungs, while being inserted to the depth needed. As the airways are quite small, the medical device must have a small diameter in the distal section to be able to travel down the airways at the periphery of the lung, without damaging the lungs.

Exemplary robots work by driving or controlling wires running through conduits in the wall of the robot which are attached at the distal end, like tendons. The driving wires are connected to the distal ends of each bending section, and forces acting on the proximal end of these wires create a bending moment in that section. There can be multiple bending sections in one continuum robot, although most of the medical devices referenced only have one. This is likely because multiple bending sections increase the overall size of the robot. In addition, multiple control wires increase the crosstalk effects from one bending section to another. Currently as most manual catheters currently have one, pre-bent section that the physician manually rotates to 'steer', the added degrees of freedom are a large step from the industry standard.

The name continuum robot implies that there are no discrete rotational joints present in the device. Instead, bending is distributed over a bending section to make circular arcs, rather than sharp corners. Bending sharply would not be useful in this application, since the point where bending occurs could damage the robot itself, could damage a tool such as an endoscopic camera if it were inserted in the tool channel, or could prevent a tool from being able to be inserted through the tool channel. Even when bending in smooth circular arcs, there is a limit to how large of curvature is achievable for a particular design. For these tube-like devices there is the threat of cross-sectional collapse, or kinking, which renders the tool channel inoperable by way of constriction. Accordingly, there is a need for a robot structure which allow for a greater degree of bending, while preventing kinking.

SUMMARY

Thus, to address such exemplary needs in the industry, the presently disclosed apparatus teaches an apparatus and method that comprises a bendable body having: a hollow cavity extending the length of the bendable body and a wall formed about the hollow cavity, as well as at least one control wire slideably situated in the wall and attached to the wall at a distal end of the bendable body, and at least one support wire slideably situated in the wall.

In various embodiments, the apparatus further comprising an anchor configured at the distal end of the bendable body for attaching the control wire to the wall.

In other embodiments, the wall comprises at least two lumens for slideably accommodating the at least one control wire and at least one support wire. In addition, the at least two lumens may each extend the length of the wall.

In further embodiments, the at least one support wire is attached to the wall at the distal end of the bendable body.

It is further contemplated that a second support wire may be slideably situated in the wall.

In additional embodiments, the at least one support wire is attached to a spring at the proximal end of the bendable body, wherein the spring is configured to alter a bending stiffness of the support wire.

Furthermore, the at least one support wire is attached to a driving unit at the proximal end of the bendable body, wherein the driving unit is configured to alter a bending stiffness of the support wire.

In other embodiment, the at least one support wire further comprises an outer wire and an inner wire, wherein the inner wire is slideably nested within the outer wire.

In yet additional embodiment, the support wire and control wire comprise of a radio opaque material. Furthermore, the at least one support wire is configurable in girth, length, stiffness and position within the wall to alter a bending stiffness of the bendable body.

The subject Application further teaches a medical apparatus prepared by a process comprising the steps of: providing a bendable body having a hollow cavity extending the length of the bendable body, and a wall formed about the hollow cavity, as well as at least one control wire slideably situated in the wall and attached to the wall at a distal end of the bendable body, and at least one support wire slideably situated in the wall, the process including heating the distal end of the bendable body to attach the control wire to the wall, and cooling the bendable body to set the attachment.

The Application further teaches a method for treating a subject, by providing a medical apparatus having a bendable body with a hollow cavity extending the length of the bendable body, and a wall formed about the hollow cavity, as well as at least one control wire slideably situated in the wall and attached to the wall at a distal end of the bendable body; and at least one support wire slideably situated in the wall. Wherein the treatment includes advancing the medical apparatus into a subject, bending the medical apparatus to accommodate obstacles in the subject, and treating the subject once the medical apparatus advances to a desired target in the subject.

In yet additional disclosures, the subject Application also teaches a medical apparatus with a bendable body having a hollow cavity extending the length of the bendable body, a wall formed about the hollow cavity, and a plurality of lumens spaced a distance from each other and extending the length of the bendable body, as well as at least one control wire is slideably situated in the wall and passing through the at least one of the plurality of lumens, and at least one support wire slideably situated in the wall and passing through the at least one of the plurality of lumens, which is different than the at least one of the plurality of lumens occupied by the control wire.

These and other objects, features, and advantages of the present disclosure will become apparent upon reading the following detailed description of exemplary embodiments of the present disclosure, when taken in conjunction with the appended drawings, and provided paragraphs.

BRIEF DESCRIPTION OF THE DRAWINGS

Further objects, features and advantages of the present invention will become apparent from the following detailed description when taken in conjunction with the accompanying figures showing illustrative embodiments of the present invention.

FIGS. 1A and 1B provide front cross-sectional and side perspective views, respectively, of a bendable medical device according to the existing art.

FIGS. 2A and 2B provide front cross-sectional and side perspective views, respectively, of a bendable medical device according to the existing art.

FIGS. 3A and 3B provide front cross-sectional and side perspective views, respectively, of a bendable medical device according to the existing art.

FIG. 4 depicts a perspective view of an exemplary bendable medical device, according to one or more embodiment of the subject apparatus, method or system.

FIG. 5 provides a cut-away view of an exemplary bendable medical device inserted into a cavity, according to one or more embodiment of the subject apparatus, method or system.

FIGS. 6A and 6B provide front cross-sectional and side perspective views, respectively, of an exemplary bendable medical device, according to one or more embodiment of the subject apparatus, method or system.

Figure 7:
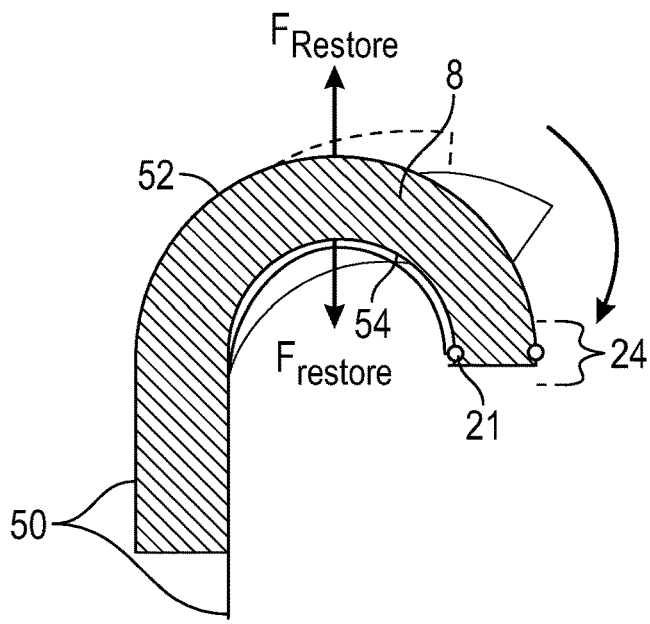
FIG. 7 provides a side perspective view of an exemplary bendable medical device, according to one or more embodiment of the subject apparatus, method or system.

Throughout the Figures, the same reference numerals and characters, unless otherwise stated, are used to denote like features, elements, components or portions of the illustrated embodiments. In addition, reference numeral(s) including by the designation "'" (e.g. 12' or 24') signify secondary elements and/or references of the same nature and/or kind. Moreover, while the subject disclosure will now be described in detail with reference to the Figures, it is done so in connection with the illustrative embodiments. It is intended that changes and modifications can be made to the described embodiments without departing from the true scope and spirit of the subject disclosure as defined by the appended paragraphs.

DETAILED DESCRIPTION OF THE DISCLOSURE

FIGS. 1 through 3 provide variants of bendable medical devices currently known in the art. FIGS. 1A and 1B are illustrations of the medical device disclosed in U.S. Pat. No. 7,914,466 to Davis et al., and detail a flexure-cut tube where alternating relief cuts in perpendicular axes allow the tube to bend much more easily in two degrees of freedom, while maintaining a reasonable amount of axial stiffness compared to the uncut tube. The flexure cut geometry is highly variable and can be customized for specific need and application. The flexure cut backbone is typically made from a nitinol or stainless steel hypodermic tube, which means it suffers from the same challenge to miniaturization that other structures do, namely that the driving wires must be routed on the inside or the outside of the tube wall. If run on the inside, the tool channel is reduced in diameter, and when run on the outside of the tube wall the overall diameter of the device is increased, which further lends support for the currently contemplated need in the field of art.

FIGS. 2A and 2B also depict a typical bendable medical device know in the art, wherein a wound, spring-like structure provides some axial stiffness due to the solid length of the coil under compression. The coil may be spring-like, where the wound wire has circular cross section, or it may be more ribbon shaped with oblong or even flat cross section. This structure again suffers from the fact that the driving wires must run on either the inside or the outside of the tube cross section, and thereby increase the outer diameter of the catheter or reduce the tool channel diameter.

FIGS. 3A and 3B are yet another common support structure used in continuum robotics, wherein a wound or braided structure is used to provide rigidity and prevent kinking. The advantage of the wound or braided structure is that the overall tube or sleeve structure is capable of high bending strain, because the individual strands of material that make up the tube are routed around the tube in a direction non-parallel to the axis of the tube, as well as the ability of the individual strands to translate relative to each other. Although this structure does not possess as much axial rigidity as the previous examples, it also suffers from the addition of cross sectional space as the driving wires must run on either the inside or the outside of the tube cross section.

The subject innovation is hereby detailed in FIGS. 4 through 12, wherein various embodiments are contemplated and disclosed. Briefly stated, the issues resolved by the subject innovation involve adding support to the structure to dissuade kinking, without adding to the cross sectional area of the bendable body, as well as without significantly adding to the bending stiffness of the bendable body. This in return allows for a high bend curvature without kinking and/or cross sectional collapse of the tub-like bendable body.

FIG. 4 is a schematic drawing to explain the bendable segments of the bendable medical device 3. The bendable medical device 3 comprises a proximal part 19 and three bendable segments, which are the first, second, and third bendable segments 12, 13, 14, respectively. The bendable segments 12, 13, 14, can independently bend and can form a shape with three independent curvatures, as seen in FIGS. 4 and 5.

FIG. 5 provides a cut-away view of an exemplary bendable medical device 3 inserted into a cavity, specifically, the peri-bronchial area of a patient's lungs, which is a lateral area surrounding the airways. This area is a known challenge to target as identified in literature, and the prior art, due to the limited distal dexterity of the conventional catheter. To reach the lesion through airways 22 in the navigation stage, the first and the second bendable segments 12, 13, respectively, navigate the bendable medical device 3 through the bifurcation point 32. The first bendable segment 12 can adjust the shape/orientation to the daughter branch while the second bendable segment 13 can adjust the shape/orientation to the parent branch in the bifurcation point 32, as the bendable medical device 3 advances through the bifurcation point 32. Once the first and the second bendable segments 12 and 13 pass the bifurcation point 32, those segments may act as guides for the rest of the bendable medical device 3, so that the insertion force from the proximal end of the bendable medical device 3 can be effectively transformed into the insertion force for a distal part of the bendable medical device 3 without serious prolapsing of the distal section. Once the distal end 24 of the bendable medical device 3 reaches the vicinity of the lesion 23, the bendable medical device 3 would direct the distal end 24 to the lesion 23, which locates the lateral area around the airway, by bending the first and the second bendable segments 12 and 13, respectively. Since the airway doesn't directly connect with the lesion 23, this is one of the more difficult configurations for a conventional catheter.

With the first, the second and the third bendable segments 12, 13 and 14, respectively, the bendable medical device 3 can orient the distal end 24 without moving the proximal part 19 that goes through all bifurcations to this lesion 23. By using the three-dimensional bending capability of the first and the second bendable segments 12 and 13, the bendable medical device 3 can perform unique maneuvers to enhance capability of the peri-bronchial targeting. Therefore, the bendable medical device 3 can provide improved access to the intended lesion 23 through tortuous pathways. Also, the bendable medical device 3 can have different flexibility along the axial direction without increasing the size or number of the jointing points.

In the subject embodiment depicted in FIGS. 6A and 6B, the bendable medical device 3 has an outer diameter 42 which is miniaturized to fit within the peripheral airways of the lung (approximately 3 mm), while maintaining a proper sized tool channel 18 (approximately 2 mm inner diameter) established by the inner diameter 40. This leaves an annular wall 8 with a thickness of approximately 0.5 mm to house the control wires 9, 10, 11, and establish rigidity to prevent kinking. Each of the bendable segments 12-14 have at least two control wires 9-11, respectively, which leaves little room to spare. The constraint on the wall 8 thickness of the bendable body 7 and the existence of multiple control wires 9, 10, 11, already running through the wall 8 severely limits the cross sectional space.

In order to address the kinking issues, support wires 50 are provided in the wall 8 of the bendable body 7, and may be anchored to the distal end 24 of a bending segment 12-14. The support wires 50 may run through lumens 34 configured in the wall 8, which may originate at the proximal part 19 of the bendable medical device 3. In certain embodiment, the support wires 50 in the distal bending sections run through the proximal part 19 to provide the same benefit. In one embodiment, all the support wires 50 may extend from the distal end 24 of the bendable medical device 3 to the proximal part 19 of the bendable medical device 3, thus allowing all segments 12-14 of the bendable body 7 to gain the kink prevention benefits.

In application, as the bendable medical device 3 bends, the support wires 50 prevent the cross section of the tube from collapsing or kinking, by providing a restoring force against the tendency for the wall 8 to flatten. As depicted in FIG. 7, a bendable body 7 is bent with two support wires 50 attached at the distal end 24 of the wall 8, while allowing the support wires 50 to freely slide through their respective lumens 34. When the bendable body 7 is bent by external forces, the length of the two opposing top surface 52 and bottom surface 54 of the bendable body 7 change, due to their offset from the neutral bending axis. Because the support wires 50 are only fixed at one end of the wires 50, in this example the distal end 24, the support wires 50 are free to slide within the respective lumens 34. If the support wires 50 were attached at both the proximal part 19 and distal end 24, the support wires would have to change length to match the change in length for the top surface 52 and bottom surface 54 of the bendable body 7. Additionally, when the support wires 50 are bent, but not axially strained as is this case, the bent support wires 50 may provide a restorative force.

Figure 8A:
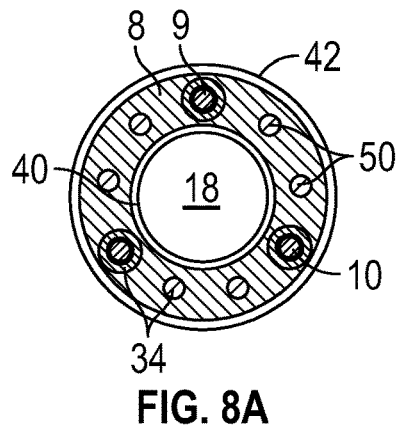
FIGS. 8A through 8F depict front cross-sectional views of various exemplary bendable medical device, incorporating different support wire placements, according to one or more embodiment of the subject apparatus, method or system.

FIGS. 8A-8F depict cross-sectional images that show various configurations for placement of the support wires 50, relative to the control wires 9-11, and within the wall 8 of the bendable body 7. In addition, the number, size and placement of the support wires 50 can be varied to provide specific mechanical properties, such as bending stiffness in a particular direction. The ability to customize the bending stiffness with respect to the bending direction is yet another very advantageous effect when designing a complicated structure that has asymmetry. The figures show several examples of how the number, size and position of the support wires 50 can be varied to produce the desired mechanical effect. The control wires 9-11, wall 8, lumens 34 and tool channel 18 are for ease of understanding. As can be seen, noncircular, nonconcentric structures with any number of control wires 9-11 located at any position in the cross section will also benefit from the design advantage that the support wires 50 provide. FIG. 8A provides a symmetric layout with equally spaced, equally sized support wires 50.

Figure 8B:
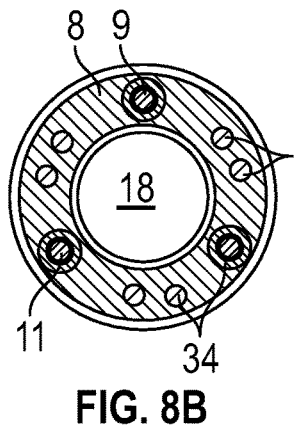
Figure 8C:
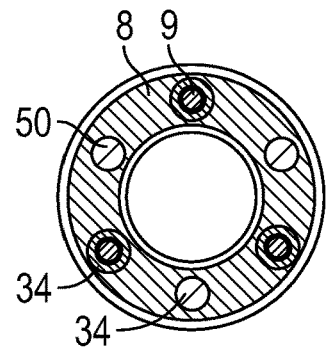
Figure 8D:
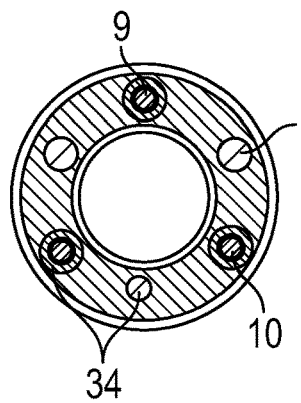
Figure 8E:
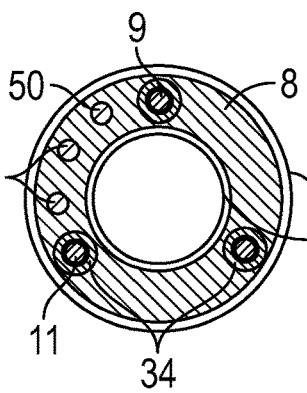
Figure 8F:
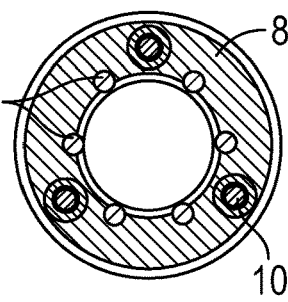

FIG. 8B depicts a symmetric layout of densely spaced, equally sized support wires 50. FIG. 8C shows symmetrically placed large support wires 50. FIG. 8D provides mixed sized support wires 50, with FIG. 8E showing asymmetrically placed support wires 50. Finally, FIG. 8F depicts support wires 50 placed offset from the control wire 9-11 radius.

Figure 9:
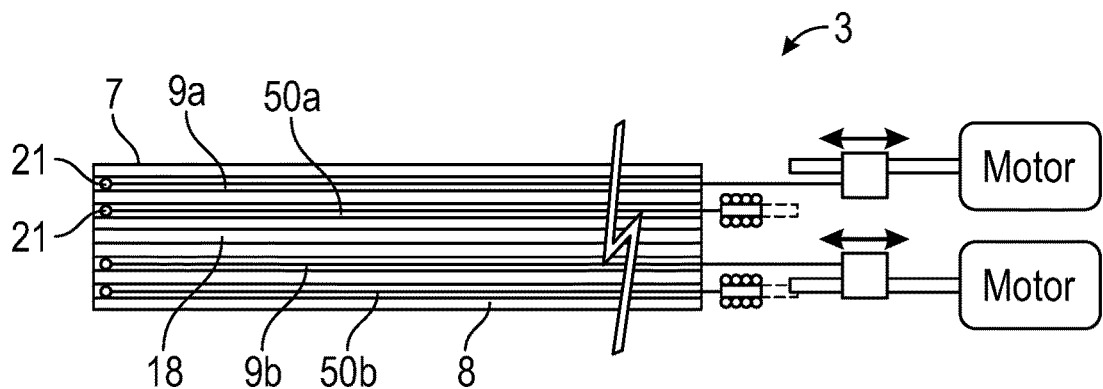
FIG. 9 illustrates a side perspective cut-out view of an exemplary bendable medical device, according to one or more embodiment of the subject apparatus, method or system.

FIG. 9 illustrates a side perspective cut-out view of an exemplary bendable medical device 3, according to one or more embodiment of the subject apparatus, method or system. The exemplary bendable body 7 has four lumens 34 and a central tool channel 18. Each of the four lumens 34 is occupied by two control wires 9a and 9b, as well as two support wires 50a and 50b. The support wires 50 are free to translate inside the respective lumens 34, while being anchored by the anchors 21 to the body 7 at the distal ends 24 of the bendable body 7. This represents one exemplary embodiment of the subject innovation, where the support wires 50 simply bend along with the wall 8 structure in a passive manner. This configuration provides minimal added flexural rigidity to the overall bendable medical device 3 structure while adding to the longitudinal stiffness and preventing kinking or binding.

Figure 10:
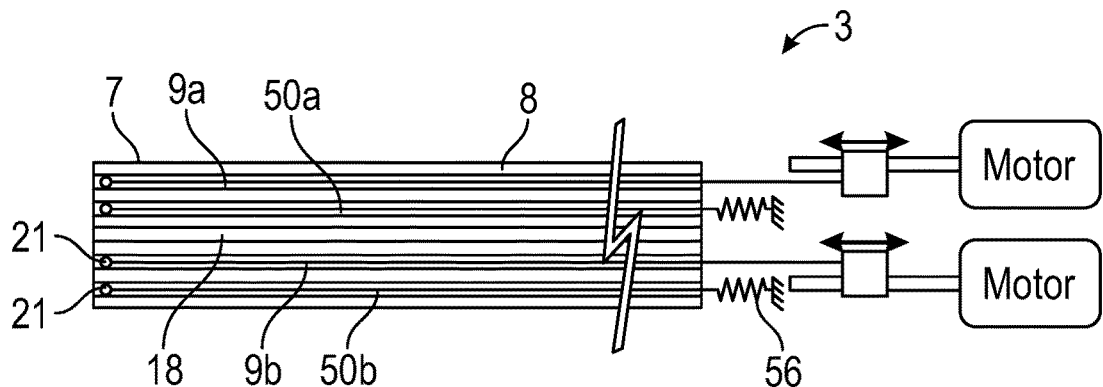
FIG. 10 illustrates a side perspective cut-out view of an exemplary bendable medical device, according to one or more embodiment of the subject apparatus, method or system.

FIG. 10 illustrates a side perspective cut-out view of an exemplary bendable medical device 3, according to one or more embodiment of the subject apparatus, method or system. Similar to FIG. 9, except the proximal ends of the support wires 50 are attached to the proximal end of the bendable medical device 3 by springs 56. The benefit of this embodiment is that the support wires 50 can be elected for preloading, by the springs 56, or be set to a neutral position, allowing for adjustability based on the desired stiffness required by the end user. The bending medical device 3 becomes marginally stiffer in bending, which in turn allows the bending medical device 3 to more easily straighten itself when driving wire forces are neutralized.

Figure 11:
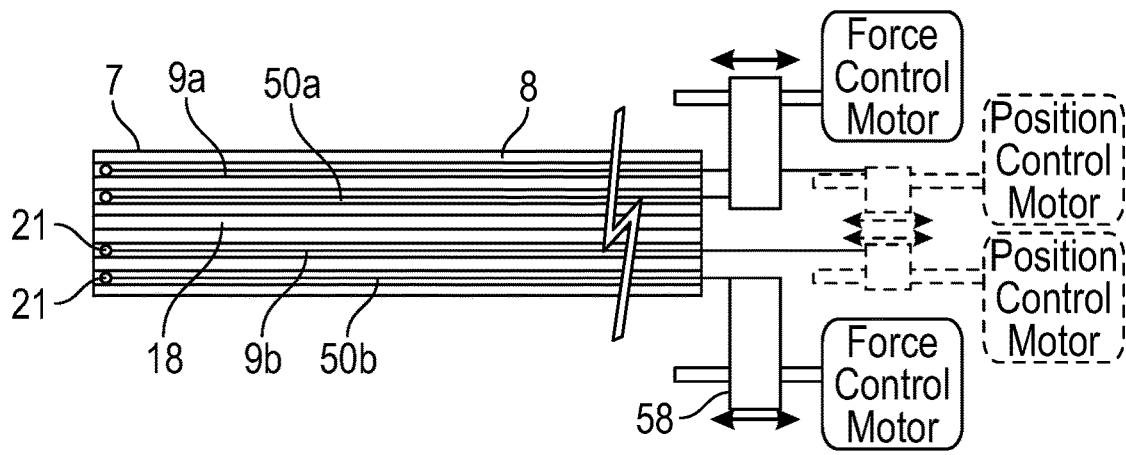
FIG. 11 provides a side perspective cut-out view of an exemplary bendable medical device, according to one or more embodiment of the subject apparatus, method or system.

FIG. 11 provides a side perspective cut-out view of an exemplary bendable medical device 3, according to one or more embodiment of the subject apparatus, method or system. In this embodiment, the proximal ends of support wires 50 are attached to the proximal part 19 of the bendable medical device 3 and actuated by independent force control modules 58, such that the total force acting longitudinally on the support wires 50 is negligible. In this way, the bendable medical device 3 becomes more resilient to kinking while providing minimal extra bending stiffness. Once again, to allow for fine adjustment of the bending stiffness while eliminating kinking and binding.

Key advantages of the subject innovation are that the structure can be incorporated into miniaturized medical devices and continuum robots without the need for an additional cross section support and added girth. The support structure is integrated within the existing wall and in cooperation with the required driving wires, wherein the support wires can be formed in the same way, at the same time, and cooperate with existing control wires.

In addition, the number, placement, rigidity and size of support wires can be selected to customize the additional bending stiffness of the bendable medical device 3 to suit varying requirements. This is advantageous when the bendable medical device structure already has asymmetric features. For bending sections that have two degrees of freedom (bend about the x and y direction vector) the ability to bend the bendable medical device uniformly in any direction is a high priority. The support wire structure allows the bendable medical device to have greater design freedom. Likewise, the placement of support wires can be customized to control the overall bending stiffness and axial stiffness (for insertability) of each bending section.

The invention claimed is:

1. A medical apparatus comprising:
a bendable body comprising:
a hollow cavity extending the length of the bendable body; and
a wall formed about the hollow cavity;
at least one control wire slideably situated in the wall and anchored at a distal end of the bendable body, the at least one control wire configured to be driven by at least one force controller; and
at least one support wire slideably situated in the wall, wherein the at least one support wire is fixedly attached along the bendable body, is freely movable at a proximal end of the bendable body, and is configured to prevent kinking of the bendable body.

2. The apparatus of claim 1, further comprising an anchor at the distal end of the bendable body for attaching the at least one control wire to the wall.

3. The apparatus of claim 1, wherein the wall comprises at least two lumens for slideably accommodating the at least one control wire and the at least one support wire.

4. The apparatus of claim 3, wherein the at least two lumens each extend the length of the wall.

5. The apparatus of claim 1, wherein the at least one support wire is slidable at the proximal end of the bendable body without being driven by a force controller.

6. The apparatus of claim 1, wherein the support wire is slideably situated in the wall, extending from the proximal end of the bendable body in a direction opposite the distal end.

7. The apparatus of claim 1, wherein the support wire and the at least one control wire comprise a radio opaque material.

8. The apparatus of claim 1, wherein the at least one support wire is configurable in girth, length, stiffness and position within the wall to alter a bending stiffness of the bendable body.

9. A medical apparatus comprising:
a bendable body comprising:
a distal end, a proximal end, and a hollow cavity extending a length of the bendable body from the distal end to the proximal end;
a wall formed about the hollow cavity; and
a plurality of lumens spaced a distance from each other and extending the length of the bendable body,
at least one control wire slideably situated in the wall and passing through the at least one lumen of the plurality of lumens, with a proximal end of the at least one control wire being configured to be driven at the proximal end of the bendable body; and
a plurality of support wires each having a first end and a second end, the plurality of support wires each being slideably situated in the wall and passing through respective lumens of the plurality of lumens, different than the at least one lumen of the plurality of lumens occupied by the at least one control wire,
wherein each first end of the plurality of support wires is fixedly attached to the distal end of the bendable body and each second end of the plurality of support wires is free floating within the bendable body, wherein the plurality of support wires are configured to prevent kinking of the bendable body.

10. The medical apparatus of claim 9, further comprising an anchor configured at a distal end of the at least one control wire, wherein the anchor is affixed to the at least one of the plurality of lumens.

11. The apparatus of claim 9, wherein the plurality of support wires are one of symmetrically and/or equidistantly arranged around the hollow cavity, and
    wherein the plurality of support wires are not configured to be driven by a force controller.

12. The apparatus of claim 9, wherein at least one support wire of the plurality of support wires is configurable in girth, length, stiffness and position within the wall to alter a bending stiffness of the bendable body.

13. The apparatus of claim 9, wherein each of the plurality of support wires is slideably situated in the wall,
    wherein at least a portion of the at least one control wire extends from the proximal end of the bendable body in a direction opposite the distal end, to be driven by at least one force controller, and
    each second end of the plurality of support wires is maintained within the proximal end of the bendable body in the direction opposite the distal end, not to be driven by at least one force controller.

* * * * *